United States Patent
Kim et al.

(10) Patent No.: US 10,481,410 B2
(45) Date of Patent: Nov. 19, 2019

(54) REFLECTING MODULE FOR OIS AND CAMERA MODULE INCLUDING THE SAME

(71) Applicant: Samsung Electro-Mechanics Co., Ltd., Suwon-si (KR)

(72) Inventors: Jae Kyung Kim, Suwon-si (KR); Bong Won Jeong, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 147 days.

(21) Appl. No.: 15/813,415

(22) Filed: Nov. 15, 2017

(65) Prior Publication Data

US 2018/0259787 A1    Sep. 13, 2018

(30) Foreign Application Priority Data

Mar. 8, 2017    (KR) .......................... 10-2017-0029723

(51) Int. Cl.
*G02B 27/64*    (2006.01)
*H04N 5/232*    (2006.01)
(Continued)

(52) U.S. Cl.
CPC ............. *G02B 27/646* (2013.01); *G02B 7/09* (2013.01); *H04N 5/2254* (2013.01);
(Continued)

(58) Field of Classification Search
CPC .. G02B 27/64; G02B 27/646; H04N 5/23248; H04N 5/23264; H04N 5/2328; H04N 5/23287
(Continued)

(56) References Cited

U.S. PATENT DOCUMENTS 6,526,194 B1 *    2/2003    Laor .................... G02B 6/3572
                                                       385/15
8,553,303 B2 *    10/2013   Mizoguchi ........... G02B 26/101
                                                       359/199.3
(Continued)

FOREIGN PATENT DOCUMENTS

EP    3 163 352 A1    5/2017
JP    3852073 B2     11/2006
(Continued)

OTHER PUBLICATIONS

Korean Office Action dated Feb. 22, 2019 in corresponding Korean Patent Application No. 10-2017-0029723 (6 pages in English and 5 pages in Korean).
(Continued)

*Primary Examiner* — Arnel C Lavarias
(74) *Attorney, Agent, or Firm* — NSIP Law (57) ABSTRACT

A reflecting module for optical image stabilization (OIS) includes: a housing; a moving holder supported in the housing by an elastic member; a reflecting member provided on the moving holder; and a driving part configured to provide driving force to the moving holder, wherein the driving part includes: two magnets having a shorter length in a first axial direction than in a second axial direction perpendicular to the first axial direction and disposed on the moving holder to be spaced apart from each other in the first axial direction; and four or more coils disposed on the housing, the four or more coils being disposed as two sets, respectively including a first set of two or more coils aligned in the second axial direction and spaced apart from each other in the first axial direction to face the two magnets, respectively.

16 Claims, 11 Drawing Sheets

(51) Int. Cl.
*G02B 7/09* (2006.01)
*H04N 5/225* (2006.01)

(52) U.S. Cl.
CPC ......... *H04N 5/2257* (2013.01); *H04N 5/2328* (2013.01); *H04N 5/23287* (2013.01); *G03B 2205/0015* (2013.01); *G03B 2205/0069* (2013.01)

(58) Field of Classification Search
USPC .............. 359/554, 555, 556, 557; 250/201.1, 250/201.2, 201.4; 348/208.99, 208.2, 348/208.12; 396/52, 55
See application file for complete search history.

(56) References Cited

U.S. PATENT DOCUMENTS

| | | | |
|---|---|---|---|
| 8,727,548 B1* | 5/2014 | Obrien | G02B 27/646 359/872 |
| 9,285,566 B2* | 3/2016 | Chan | G02B 13/009 |
| 9,488,829 B2* | 11/2016 | Matozaki | G02B 27/01 |
| 2011/0097061 A1 | 4/2011 | Lee et al. | |
| 2015/0042870 A1 | 2/2015 | Chan et al. | |
| 2017/0195566 A1* | 7/2017 | Hu | G02B 26/101 |
| 2018/0364450 A1* | 12/2018 | Lee | G02B 7/18 |
| 2019/0101808 A1* | 4/2019 | Byon | G03B 5/02 |

FOREIGN PATENT DOCUMENTS

| | | |
|---|---|---|
| JP | 2016-12042 A | 1/2016 |
| KR | 10-2009-0084505 A | 8/2009 |
| KR | 10-2011-0045343 A | 5/2011 |

OTHER PUBLICATIONS

Korean Office Action dated Aug. 22, 2018 in corresponding Korean Patent Application No. 10-2017-0029723 (5 pages in English, 4 pages in Korean).

\* cited by examiner

REFLECTING MODULE FOR OIS AND CAMERA MODULE INCLUDING THE SAME

CROSS-REFERENCE TO RELATED APPLICATION(S)

This application claims benefit under 35 USC § 119(a) of priority to Korean Patent Application No. 10-2017-0029723 filed on Mar. 8, 2017 in the Korean Intellectual Property Office, the entire disclosure of which is incorporated herein by reference for all purposes.

BACKGROUND

1. Field

The description relates to a reflecting module for optical image stabilization (OIS) and a camera module including the same.

2. Description of Related Art

Recently, camera modules have been generally installed in portable electronic devices such as tablet personal computers (PCs), laptop PCs, and the like, as well as in smartphones, and an autofocusing function, an optical image stabilization (OIS) function, a zoom function, and the like, have been implemented in camera modules for mobile terminals.

However, in order to implement various functions, the structures of such camera modules have become complicated and the sizes thereof have increased, resulting in difficulty in mounting such camera modules in portable electronic devices.

In addition, when a lens or an image sensor is directly moved for the purpose of optical image stabilization, both a weight of the lens or of the image sensor itself and weights of other members to which the lens or the image sensor is attached should be considered, and a certain level or more of driving force is thus required, resulting in increased power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a reflecting module for optical image stabilization (OIS) includes a housing including an internal space, a moving holder supported in the internal space of the housing by an elastic member, a reflecting member disposed on the moving holder; and a driving part configured to provide driving force to the moving holder such that the moving holder moves relative to the housing, wherein the driving part includes two magnets having a shorter length in a first axial direction than in a second axial direction perpendicular to the first axial direction and disposed on the moving holder to be spaced apart from each other in the first axial direction, and four or more coils disposed on the housing, the four or more coils disposed as two sets, comprising a first set of two or more coils aligned in the second axial direction and spaced apart from each other in the first axial direction facing the magnets.

The second set of coils may include a second set of two or more coils aligned in the second axial direction and spaced apart from each other in the first axial direction facing the two magnets.

The two magnets may be configured to rotate the moving holder around a first axis and a second axis.

One side of the magnets in the second axial direction may be North poles, and the other side of the magnets in the second axial direction may be South poles.

The four or more coils may be disposed in positions corresponding to the North poles and the South poles of the magnets.

The elastic member may include a first spring extended in the first axial direction and a second spring extended in the second axial direction, perpendicular to the first axial direction, wherein the first spring and the second spring are integral with each other.

The first spring may include one or more springs extended in the first axial direction, and the second spring may include one or more springs extended in the second axial direction.

The elastic member may include a connection portion between the first spring and the second spring having a bent or angular shape.

The elastic member may be substantially entirely coplanar.

The elastic member may be disposed on a lower surface of the moving holder, and the reflecting member may be disposed on an upper surface of the moving holder.

The elastic member may comprises two portions.

The elastic member may be entirely one piece.

The magnets may be disposed in seating grooves disposed in a lower surface of the moving holder.

In one general aspect, a camera module includes a lens module including lenses, and a reflecting module for OIS as described above, disposed in front of the lens module and configured to change a path of light incident onto the reflecting module such that the light is directed toward the lens module.

A portable electronic device may include the camera module as described above.

An optical axis of the lens module may be perpendicular to a thickness direction of the portable electronic device.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
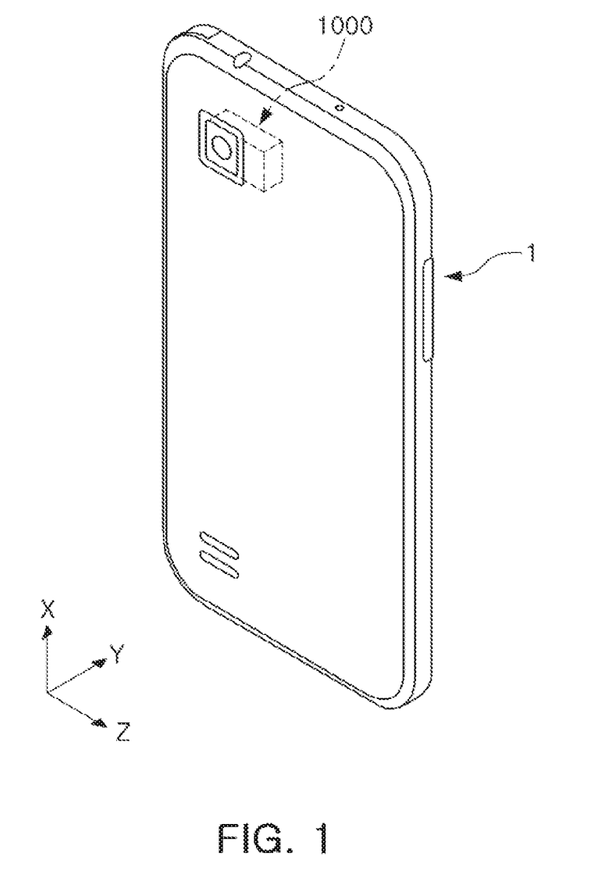
FIG. 1 is a perspective view of a portable electronic device according to an embodiment.

FIG. 1 is a perspective view of a portable electronic device according to an embodiment.

Referring to FIG. 1, a portable electronic device 1 according to an embodiment may be a portable electronic device such as a mobile communications terminal, a smartphone, a tablet personal computer (PC), or the like, in which a camera module 1000 is mounted.

As illustrated in FIG. 1, the portable electronic device 1 is provided with the camera module 1000 to capture an image of a subject.

In an embodiment, the camera module 1000 may include lenses, and an optical axis (a Z axis) of each of the lenses is directed toward a direction perpendicular to a thickness direction (a Y-axis direction or a direction from a front surface of the portable electronic device to a rear surface thereof or an opposite direction to the direction from the front surface of the portable electronic device to the rear surface thereof) of the portable electronic device 1.

As an example, the optical axis (the Z axis) of each of the lenses included in the camera module 1000 is formed in a width or length direction of the portable electronic device 1 rather than the thickness direction of the portable electronic device 1 (as an example, a structure in which the lenses are stacked in the width direction is shown in FIG. 1).

Therefore, even in an example wherein the camera module 1000 has functions such as an autofocusing (AF) function, a zoom function, an optical image stabilization (hereinafter, referred to as OIS) function, a thickness of the portable electronic device 1 is not increased. Therefore, the portable electronic device 1 may be miniaturized.

The camera module 1000 according to an embodiment has one or more of the AF function, the zoom function, and the OIS function.

Since the camera module 1000 including the AF function, the zoom function, the OIS function needs to include various components, a size of the camera module is increased as compared to a general camera module.

When the size of the camera module 1000 is increased, a problem occurs in miniaturizing the portable electronic device 1 in which the camera module 1000 is mounted.

For example, when the number of stacked lenses in the camera module is increased for the purpose of the zoom function and stacked lenses are disposed in the camera module in the thickness direction of the portable electronic device, a thickness of the portable electronic device is also increased depending on the number of stacked lenses. Therefore, when the thickness of the portable electronic device is not increased, the number of stacked lenses may not be sufficiently secured, such that zoom performance deteriorates.

In addition, an actuator moving a lens group in an optical axial direction or a direction perpendicular to the optical axis needs to be installed in order to implement the AF function and the OIS function, and when the optical axis (the Z axis) of the lens group is formed in the thickness direction of the portable electronic device, the actuator moving the lens group needs also to be installed in the thickness direction of the portable electronic device. Therefore, a thickness of the portable electronic device is increased.

However, in the camera module 1000 according to an embodiment, the optical axis (the Z axis) of each of the lenses is disposed perpendicularly to the thickness direction of the portable electronic device 1. Therefore, even in the case that the camera module 1000 having the AF function, the zoom function, and the OIS function is mounted in the portable electronic device 1, the portable electronic device 1 is miniaturized.

Figure 2:
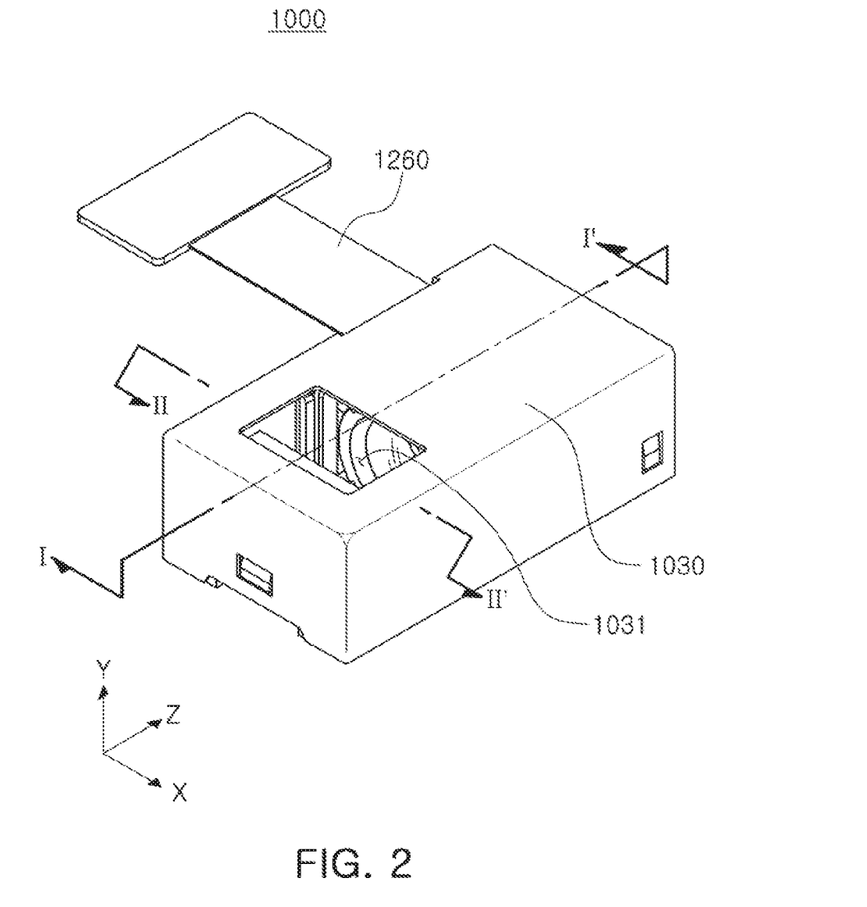
FIG. 2 is a perspective view of a camera module according to embodiments.
Figure 3:
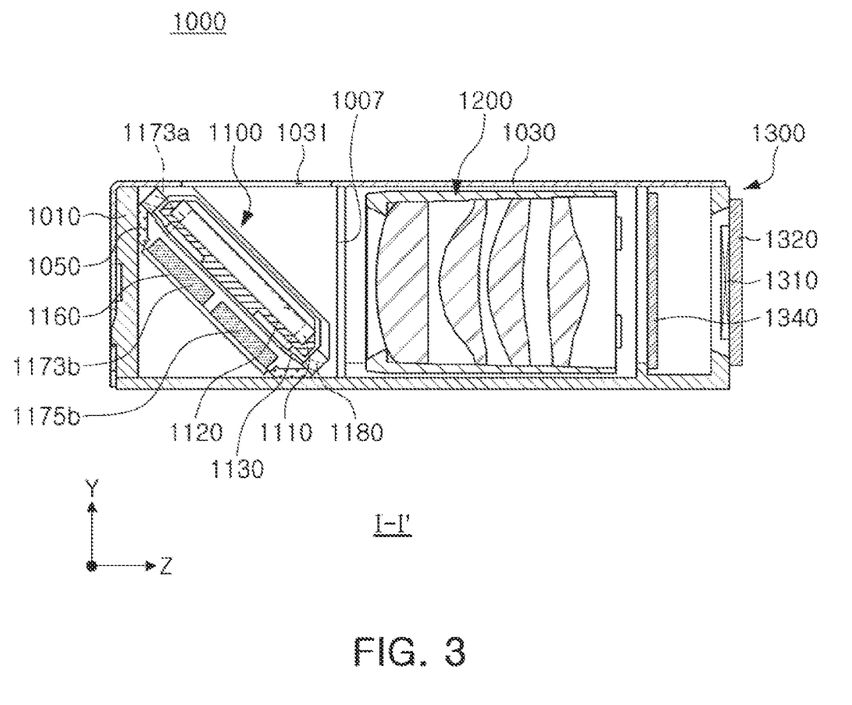
FIG. 3 is a cross-sectional view of a camera module according to an embodiment.

FIG. 2 is a perspective view of a camera module according to embodiments, and FIG. 3 is a cross-sectional view of a camera module according to an embodiment.

Referring to FIGS. 2 and 3, a camera module 1000 according to an embodiment includes a reflecting module 1100 for OIS (hereinafter, referred to as a 'reflecting module'), a lens module 1200, and an image sensor module 1300 provided in a case 1010.

The reflecting module 1100 may change a direction of light. As an example, a direction of light incident through an opening 1031 of a cover 1030 covering an upper portion of the camera module 1000 is changed through the reflecting module 1100 so that the light is directed toward the lens module 1200. To this end, the reflecting module 1100 includes a reflecting member 1110 reflecting the light. A path of the light incident to the reflecting module 1100 is changed by the reflecting member 1110.

Therefore, a path of the light incident through the opening 1031 is changed by the reflecting module 1100 so that the light is directed toward the lens module 1200. For example, a path of light incident in the thickness direction (the Y-axis direction) of the camera module 1000 is changed by the reflecting module 1100 to coincide with the optical axial direction (a Z-axial direction).

The lens module 1200 includes lenses through which the light of which the moving direction is changed by the reflecting module 1100 passes, and the image sensor module 1300 includes an image sensor 1310 converting the light passing through the lenses into an electrical signal, and a printed circuit board 1320 on which the image sensor 1310 is mounted. In addition, the image sensor module 1300 includes an optical filter 1340 filtering the light incident from the lens module 1200 thereto. The optical filter 1340 may be an infrared cut-off filter.

In the case 1010, the reflecting module 1100 is provided in front of the lens module 1200, and the image sensor module 1300 is provided behind the lens module 1200.

Figure 4:
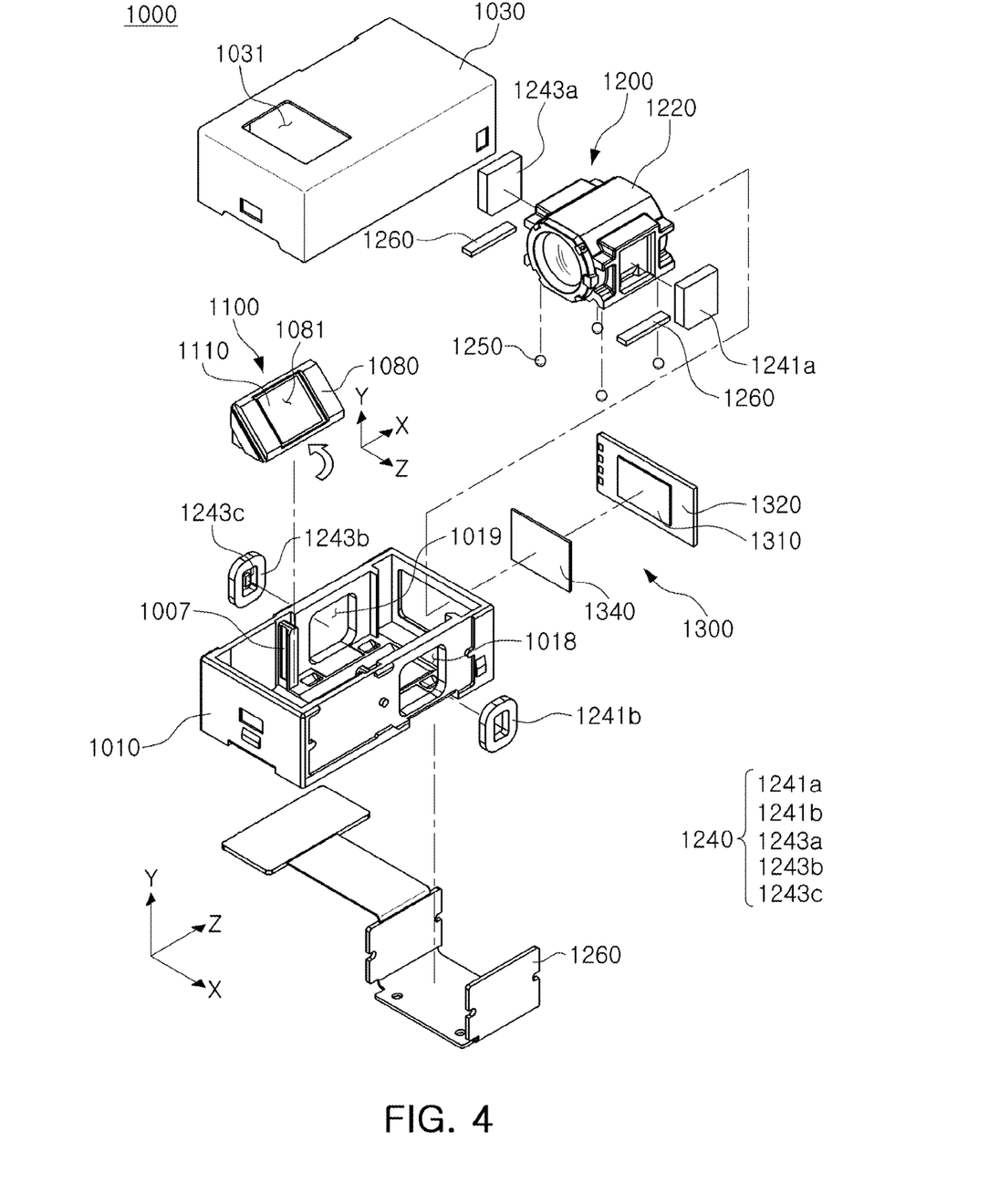
FIG. 4 is an exploded perspective view of a camera module according to an embodiment.
Figure 5:
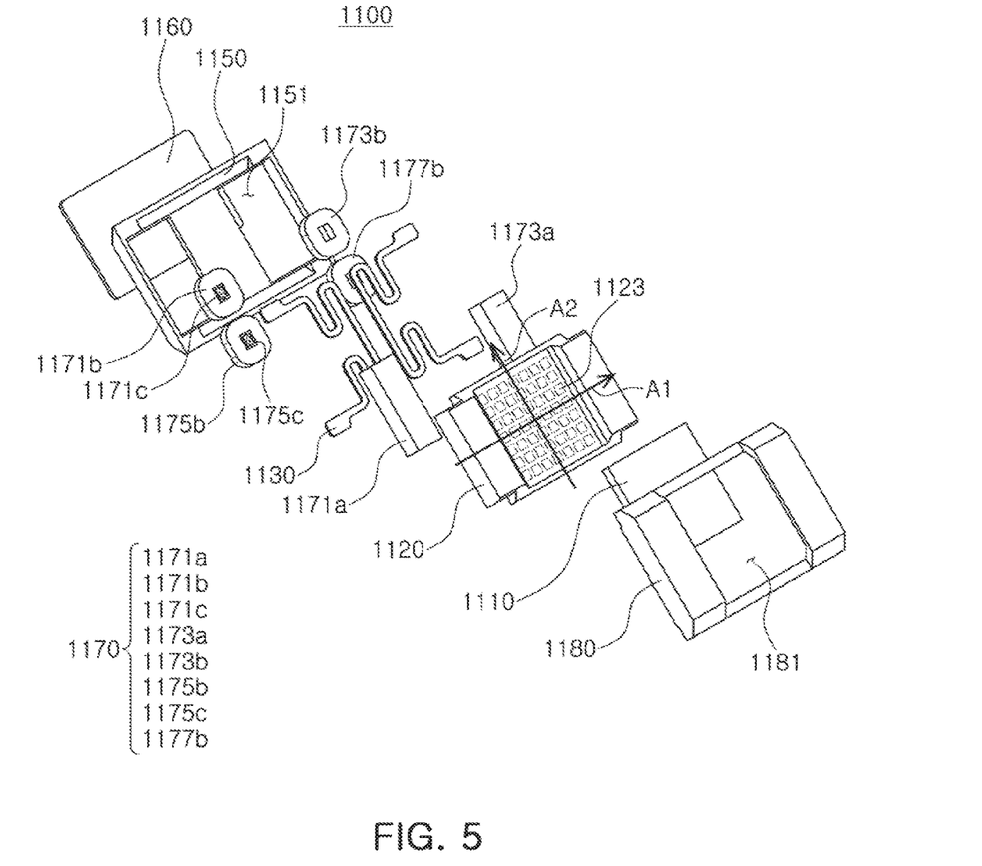
FIG. 5 is an exploded perspective view of a reflecting module of the camera module according to an embodiment.
Figure 6A:
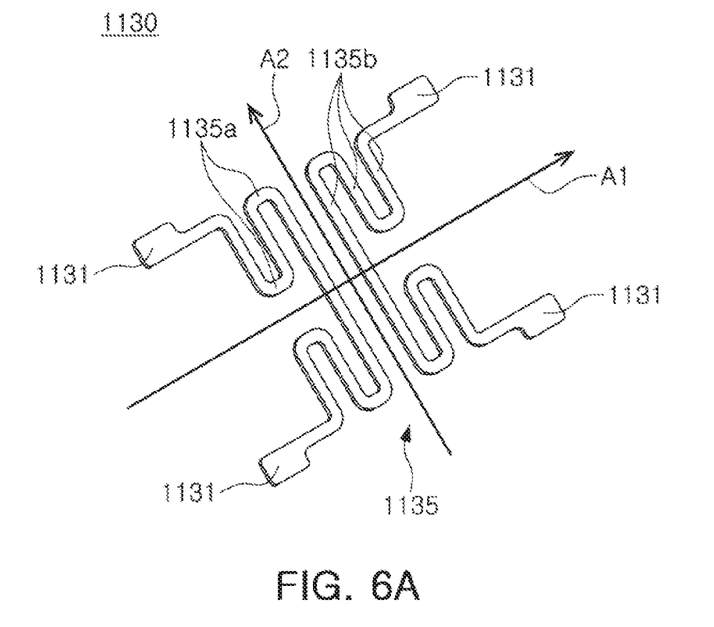
FIGS. 6A and 6B are perspective views of an elastic member of the camera module according to an embodiment.
Figure 6B:
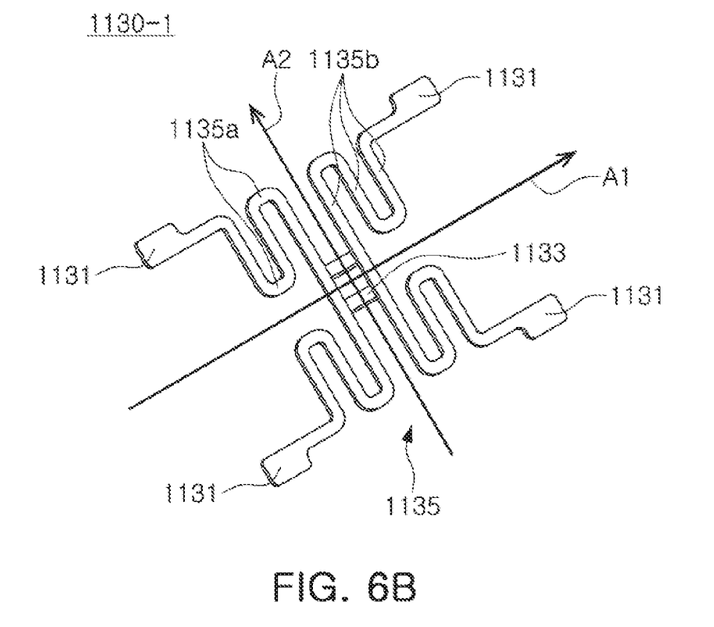

FIG. 4 is an exploded perspective view of the camera module according to an embodiment, FIG. 5 is an exploded perspective view of a reflecting module of the camera module according to an embodiment, and FIGS. 6A and 6B are perspective views of an elastic member of the camera module according to an embodiment.

Referring to FIGS. 2 through 6B, the camera module 1000 according to an embodiment includes the reflecting module 1100, the lens module 1200, and the image sensor module 1300 provided in the case 1010.

The case 1010 includes the reflecting module 1100, the lens module 1200, and the image sensor module 1300 sequentially provided from one side thereof to the other side thereof. The case 1010 has an internal space into which the reflecting module 1100, the lens module 1200, and the image sensor module 1300 are inserted (the image sensor module 1300 may be attached to an outer portion of the case 1010).

Here, as shown in the drawings, the case 1010 is entirely integrally provided so that both of the reflecting module 1100 and the lens module 1200 are inserted into the internal space of the case 1010. In addition, the case 1010 is provided integrally with a housing 1150 of the reflecting module 1100, such that the other components of the reflecting module 1100 are directly provided in the case 1010 (in this case, the case 1010 and the housing 1150 are integral). Alternatively, the reflecting module 1100 and the lens module 1200 may be separately provided, and may be attached and connected to each other to form the case 1010.

In addition, the case 1010 may be covered by the cover 1030 so that the internal space of the case 1010 is not visible.

The cover 1030 has the opening 1031 through which light is incident, and a direction of the light incident through the opening 1031 is changed by the reflecting module 1100, such that the light is incident to the lens module 1200. The cover 1030 may be integrally provided to cover the entire case 1010, or may be provided as separate members each covering the reflecting module 1100 and the lens module 1200.

To this end, the reflecting module 1100 includes the reflecting member 1110 reflecting the light. In addition, the light incident to the lens module 1200 passes through the lenses and is converted into and stored as an electrical signal by the image sensor 1310.

The case 1010 includes the reflecting module 1100 and the lens module 1200 disposed in the internal space thereof. Therefore, in the internal space of the case 1010, a space in which the reflecting module 1100 is disposed and a space in which the lens module 1200 is disposed may be distinguished from each other by protruding walls 1007 (However, the space in which the reflecting module 1100 is disposed and the space in which the lens module 1200 is disposed may be provided in an entirely single space without being separately distinguished from each other). In addition, the reflecting module 1100 is provided in front of the protruding walls 1007, and the lens module 1200 is provided behind the protruding walls 1007. The protruding walls 1007 protrude from opposite sides of the case 1010 to the internal space.

In addition, the case 1010 includes a first driving part 1170 and a second driving part 1240 each provided in order to drive the reflecting module 1100 and the lens module 1200. The first driving part 1170 includes coils 1171*b*, 1173*b*, 1175*b*, and 1177*b* for driving the reflecting module 1100, and the second driving part 1240 includes coils 1241*b* and 1243*b* for driving the lens module 1200. In addition, the coils 1171*b*, 1173*b*, 1175*b*, 1177*b*, 1241*b*, and 1243*b* are provided on the housing 1150 and the case 1010, respectively, in a state in which they are mounted on boards 1160 and 1260, respectively.

In addition, the housing 1150 is provided with a through-hole 1151 so that coils 1171*b*, 1173*b*, 1175*b*, and 1177*b* of the first driving part 1170 are exposed to an inner portion of the housing 1150, and is provided with through-holes 1018 and 1019 so that the coils 1241*b* and 1243*b* of the second driving part 1240 are exposed to the internal space in order to drive the case 1010.

In addition, the boards 1160 and 1260 on which the coils 1171b, 1173b, 1175b, 1177b, 1241b, and 1243b are mounted are flexible printed circuit boards (FPCBs) or rigid PCBs (RPCBs), and when the boards 1160 and 1260 are the FPCBs, reinforcing plates (not illustrated) may be provided on lower surfaces of the boards in order to reinforce rigidity of the boards.

The reflecting module 1100 changes the path of the light incident thereto through the opening 1031. When an image or a moving image is captured, the image may be blurred or the moving image may be shaken due to a hand-shake, or the like, of a user. In this case, the reflecting module 1100 corrects the hand-shake of the user by moving a moving holder 1120 on which the reflecting member 1110 is mounted. For example, when shaking is generated at the time of capturing the image or the moving image due to the hand-shake of the user, a relative displacement corresponding to shaking is provided to the moving holder 1120 to compensate for shaking.

In addition, in an embodiment, the OIS function is implemented by the movement of the moving holder 1120 having a relatively low weight since it does not include lenses and power consumption is significantly reduced.

That is, in an embodiment, the light on which the OIS is performed is incident to the lens module 1200 by changing the direction of the light by the movement of the moving holder 1120 on which the reflecting member 1110 is provided without moving the lens barrel including the lenses or the image sensor in order to implement the OIS function.

The reflecting module 1100 includes the reflecting member 1110, the moving holder 1120 on which the reflecting member 1110 is mounted, an elastic member 1130 supporting the moving holder 1120 so that the moving holder 1120 is moved, the housing 1150 to which the elastic member 1130 is fixedly coupled so that the moving holder 1120 is provided in an internal space thereof, the board 1160 coupled to the housing 1150, and the first driving part 1170 including the plurality of coils 1171b, 1173b, 1175b, and 1177b and hall sensors 1171c and 1175c provided on the board 1160 and a pair of magnets 1171a and 1173a provided on the moving holder 1120. Therefore, seating grooves 1120a and 1120b into which the pair of magnets 1171a and 1173a are inserted may be provided in both sides of a lower surface of the moving holder 1120. The reflecting module includes a cover 1180 disposed on the housing 1150 and having an opening 1181 through which the reflecting member 1110 is exposed.

The reflecting member 1110 changes the direction of the light. For example, the reflecting member 1110 may be a mirror or a prism reflecting the light (a case in which the reflecting member 1110 is the mirror is illustrated in the drawings associated with an embodiment for convenience of explanation).

The reflecting member 1110 is fixed to the moving holder 1120. The moving holder 1120 has a mounting surface 1123 on which the reflecting member 1110 is mounted.

The mounting surface 1123 of the moving holder 1120 may be an inclined surface so that the path of the light is changed. For example, the mounting surface 1123 is an inclined surface inclined with respect to the optical axis (the Z axis) at 45°. In addition, the inclined surface of the moving holder 1120 is directed toward the opening 1031 of the cover 1030 through which the light is incident.

The moving holder 1120 on which the reflecting member 1110 is mounted is movably accommodated in an internal space of the housing 1150. In other words, the moving holder 1120 is moved by an action of the first driving part 1170 so that an interval between the moving holder 1120 and the housing 1150 is changed, depending on each position of the moving holder 1120.

The moving holder 1120 is movably fixed to the elastic member 1130. The elastic member 1130 is also fixed to the housing 1150, and the moving holder 1120 is moved relatively with respect to the housing 1150 by driving of the first driving part 1170. Therefore, OIS may be performed.

The elastic member 1130 includes a fixed portion 1131 fixed to the housing 1150 and a moving portion 1135 extended from the fixed portion 1131 and fixed to the moving holder 1120. The moving portion 1135 is provided in a spring structure rotatable around two axes (first and second axes). In addition, the fixed portion 1131 and the moving portion 1135 are provided integral with one another. The elastic member 1130 is coupled to the moving holder 1120, and is divided into two portions disposed on one side and the other side in relation to a first axis A1 direction (see FIG. 6A). Alternatively, a portion of the elastic member 1130 disposed on one side and a portion of the elastic member 1130 disposed on the other side is provided integral with each other. In this case, springs disposed on one side and the other side in relation to the first axis A1 direction are connected to each other by a connecting portion 1133 (see FIG. 6B).

Here, since the moving holder 1120 is fixed to the housing 1150 by only the elastic member 1130, when the moving holder 1120 is moved in relation to the two axes (the first and second axes) by the first driving part 1170, the moving holder 1120 is not rotated around a rotation axis that is accurately fixed, and is moved to be entirely biased in a direction in which force is applied to the moving holder 1120 by the first driving part 1170 (a direction in which the moving holder 1120 is pulled or pushed).

The moving portion 1135 has a structure in which a first spring 1135a extended in the first axis A1 direction and a second spring 1135b extended in a second axis A2 direction perpendicular to the first axis A1 direction are provided integral with each other (here, the first axis A1 and the second axis A2, axes provided along the inclined mounting surface 1123 of the moving holder 1120, may be axes perpendicular to each other). In addition, the first spring 1135a includes one or more springs extended in the first axis A1 direction, and the second spring 1135b includes one or more springs extended in the second axis A2 direction. In addition, a connection portion between the first spring 1153a and the second spring 1135b may have a bent or angular shape. Since the moving portion 1135 is integrally provided in itself and includes the spring provided along the first axis and the spring provided along the second axis, the moving portion 1135 is freely rotatable around the first axis and the second axis.

The first driving part 1170 generates driving force so that the moving holder 1120 is rotatable around the two axes (the first axis A1 and the second axis A2). Therefore, the moving holder 1120 is moved so that an interval between the rotation holder 1120 and a bottom surface of the housing 1150 in each portion is changed.

As an example, the first driving part 1170 includes the pair of magnets 1171a and 1173a and the coils 1171b, 1173b, 1175b, and 1177b disposed to face the pair of magnets 1171a and 1173a.

When power is applied to the coils 1171b, 1173b, 1175b, and 1177b, the moving holder 1120 on which the pair of magnets 1171a and 1173a are mounted may be rotated around the first axis and the second axis by electromagnetic interaction between the pair of magnets 1171a and 1173a and the coils 1171b, 1173b, 1175b, and 1177b.

Here, the pair of magnets 1171a and 1173a have a shorter length in the first axis A1 direction than in the second axis A2 direction perpendicular to the first axis A1 direction, and are provided on the moving holder 1120 to be spaced apart from each other in the first axis A1 direction. "Spaced apart" as used herein generally means not in contact with each other. In addition, the coils 1171b, 1173b, 1175b, and 1177b are provided as two sets, respectively including two or more coils aligned in the second axis A2 direction and spaced apart from each other in the first axis A1 direction to face the magnets, respectively, on the housing 1150. Therefore, the number of coils 1171b, 1173b, 1175b, and 1177b may be four or more, and four coils or more may be provided for convenience of driving.

In addition, one sides of the pair of magnets 1171a and 1173a in the second axis A2 direction are North (N) poles, and the other sides of the pair of magnets 1171a and 1173a in the second axis A2 direction are South (S) poles, and the coils 1171b, 1173b, 1175b, and 1177b are provided, respectively, in positions corresponding to the N poles and the S poles of the pair of magnets 1171a and 1173a. The coils positioned "corresponding to" the N poles and S poles of the magnets generally means that the coils are positioned such that the magnetic field generated by the coil and the magnetic field of the magnets are able to interact with each other.

In addition, since the pair of magnets 1171a and 1173a are provided, both of the pair of magnets 1171a and 1173a are used to rotate the moving holder 1120 around the first axis A1 and the second axis A2.

The pair of magnets 1171a and 1173a are mounted on the moving holder 1120. As an example, the pair of magnets 1171a and 1173a are mounted on a lower surface of the moving holder 1120.

The coils 1171b, 1173b, 1175b, and 1177b are mounted on the housing 1150. As an example, the coils 1171b, 1173b, 1175b, and 1177b are mounted on the housing 1150 through the board 1160. That is, the coils 1171b, 1173b, 1175b, and 1177b are provided on the board 1160, and the board 1160 is mounted on the housing 1150. In addition, the housing 1150 is provided with the through-hole 1151 so that the coils 1171b, 1173b, 1175b, and 1177b provided on the board 1160 attached to an outer surface of the housing 1150 are exposed to the internal space of the housing 1150.

A reinforcing plate (not illustrated) may be mounted below the board 1160 in order to reinforce strength of the main board.

In an embodiment, when the moving holder 1120 is rotated, a closed loop control manner of sensing and feeding back a position of the moving holder 1120 is used.

Therefore, position sensors 1171c and 1175c may be required in order to perform a closed loop control. The position sensors 1171c and 1175c may be hall sensors, and may sense rotation around the first axis or the second axis, respectively.

The position sensors 1171c and 1175c may be disposed inside or outside the coils 1171b and 1175b, respectively, and may be mounted on the board 1160 on which the coils 1171b and 1175b are mounted.

Meanwhile, the board 1160 may be provided with a gyro sensor (not illustrated) sensing shaking factor such as the hand-shake, or the like, of the user, and may be provided with a driver integrated circuit (IC) (not illustrated) providing driving signals to the plurality of coils 1171b, 1173b, 1175b, and 1177b.

Figure 7A:
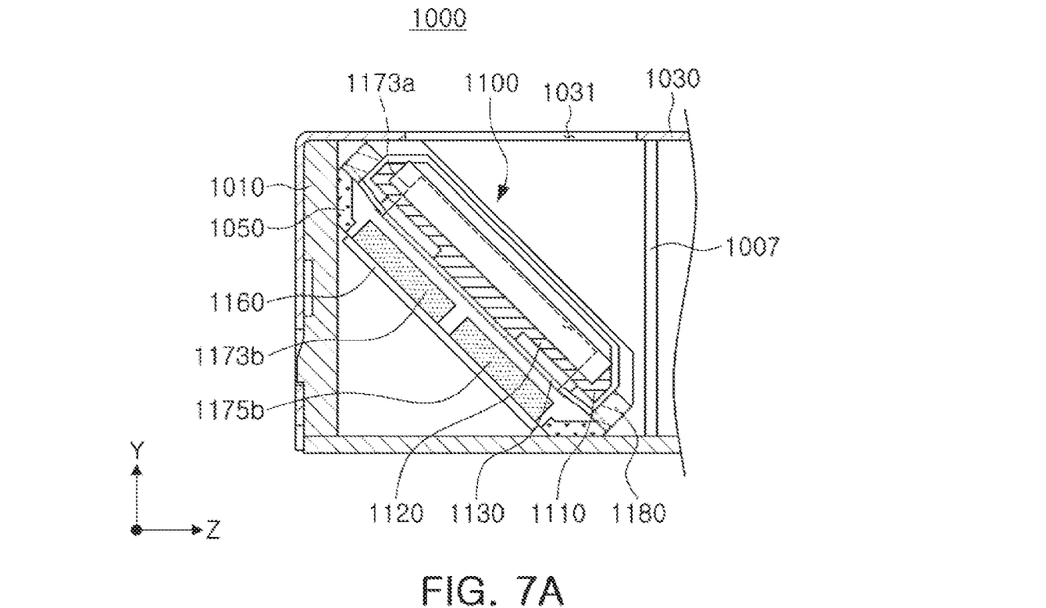
FIGS. 7A through 7C are schematic views showing an example in which a moving holder according to an embodiment is moved in relation to a first axis.
Figure 7B:
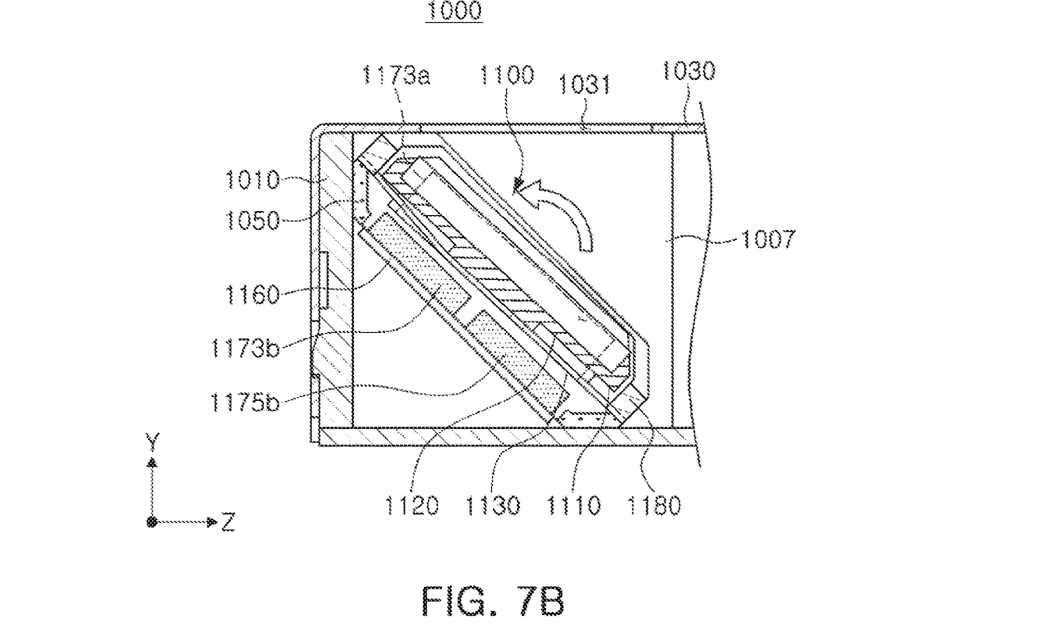
Figure 7C:
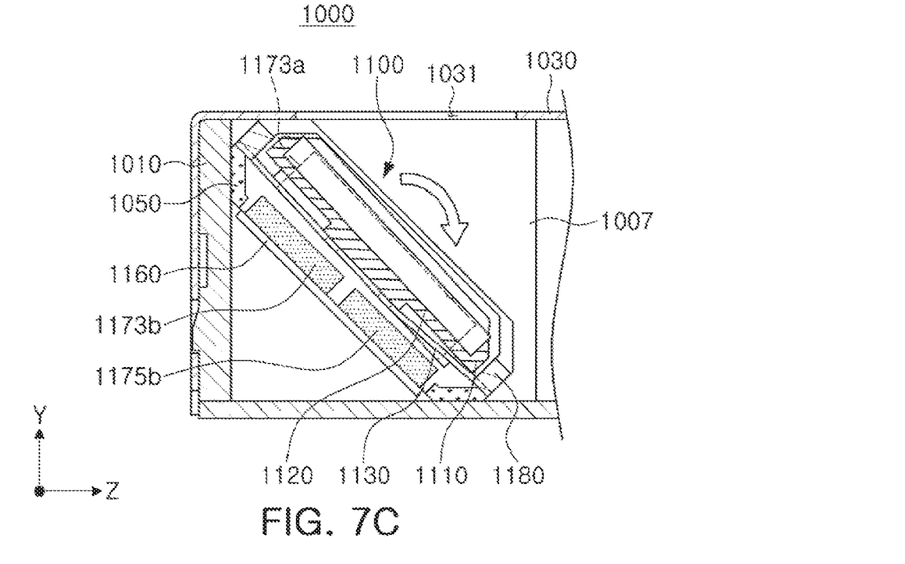
Figure 8A:
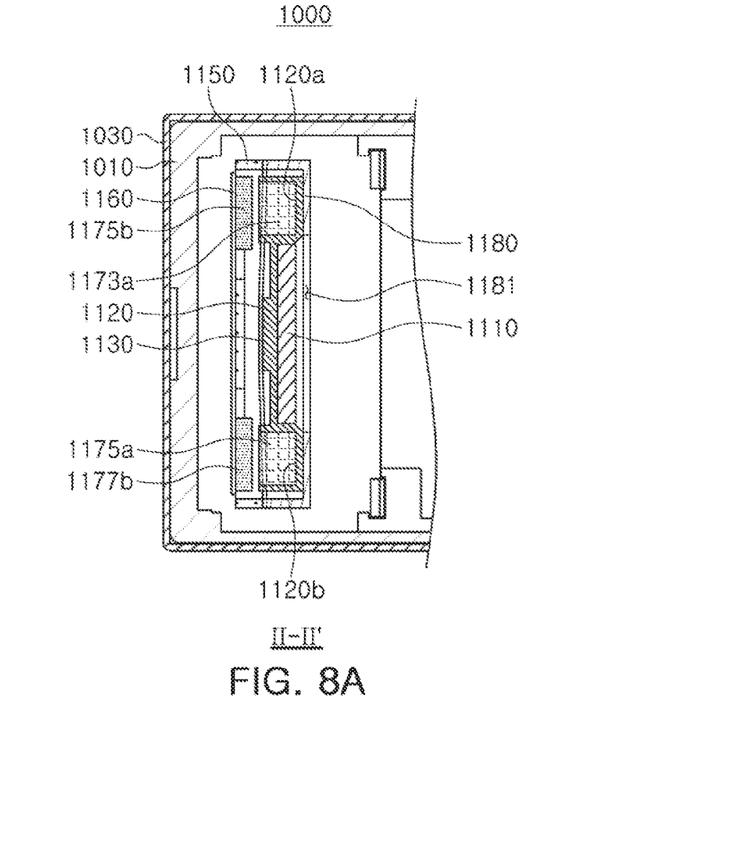
FIGS. 8A through 8C are schematic views of an example in which the moving holder according to an embodiment is moved in relation to a second axis.
Figure 8B:
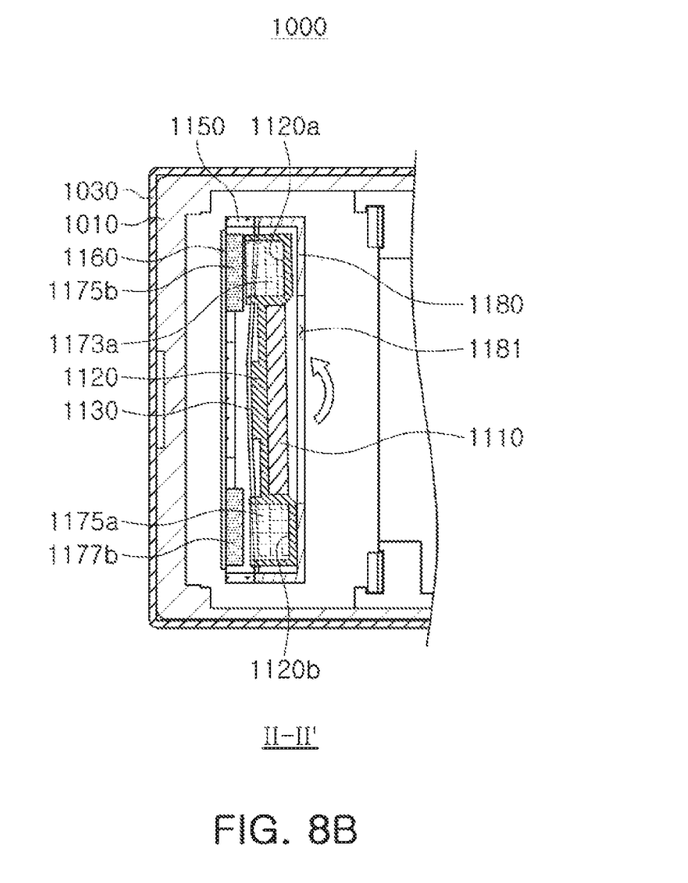
Figure 8C:
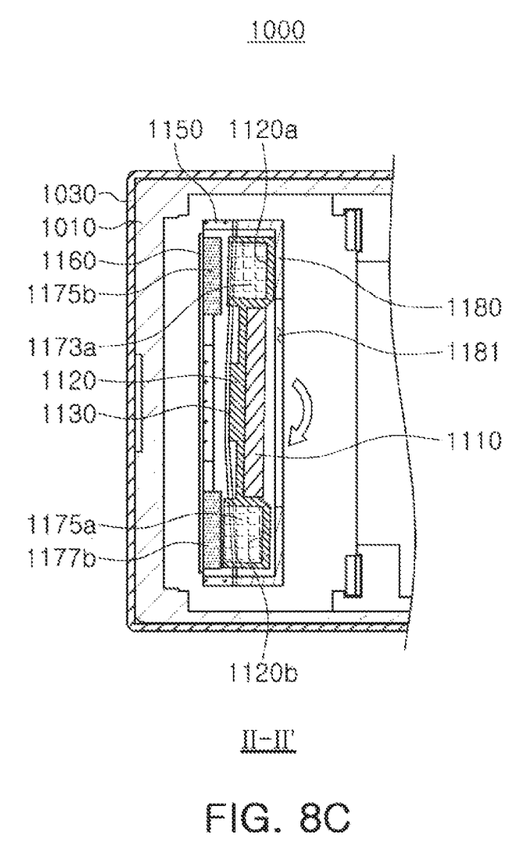

FIGS. 7A through 7C are schematic views of an example in which a moving holder according to an embodiment is moved in relation to a first axis, and FIGS. 8A through 8C are schematic views of an example in which the moving holder according to an embodiment is moved in relation to a second axis.

Referring to FIGS. 7A through 7C, when the moving holder is moved in relation to the first axis A1, the coils aligned in the second axis A2 direction perpendicular to the first axis A1 direction and the magnets are used for driving, and N poles and S poles of the magnets magnetized as the N poles and the S poles in the second axis A2 direction move toward or away from the coils aligned in the second axis A2 direction. That is, the moving holder 1120 is moved so that an interval between upper end portions of the magnets and the coils 1171b and 1173b in relation to the first axis A1 is greater or smaller than that between lower end portions of the magnets and the coils 1175b and 1177b in relation to the first axis A1.

In addition, referring to FIGS. 8A through 8C, when the moving holder is moved in relation to the second axis A2, the magnets 1171a and 1173a provided to be spaced apart from each other in the first axis A1 direction and the coils 1171b, 1173b, 1175b, and 1177b move toward or away from each other. That is, the moving holder is moved so that an interval between the magnet 1173a and the coils 1173b and 1177b disposed at an upper portion in relation to the second axis A2 is greater or smaller than that between the magnet 1171a and the coils 1171b and 1175b disposed at a lower portion in relation to the second axis A2.

Figure 9:
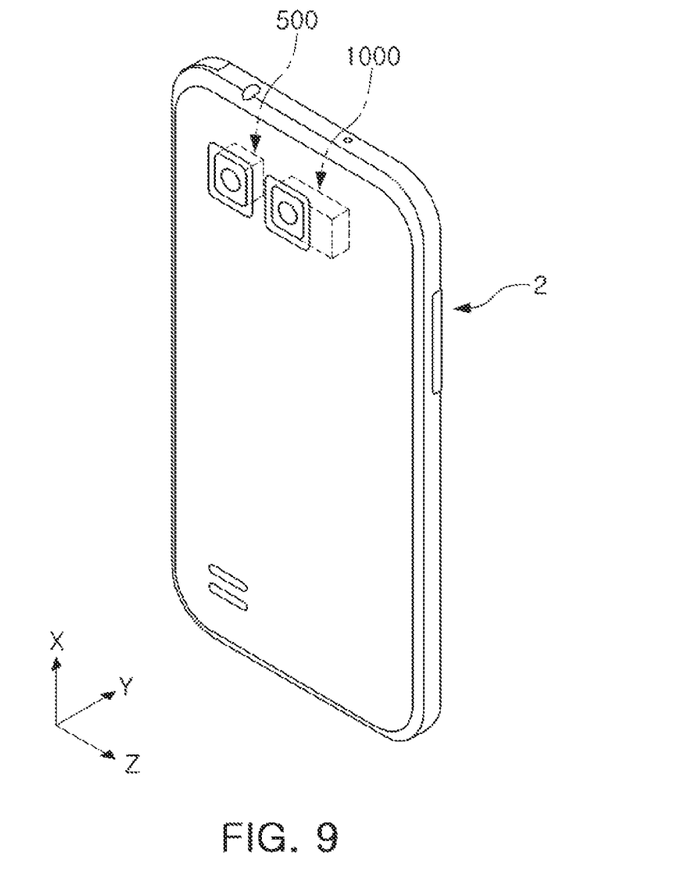
FIG. 9 is a perspective view of a portable electronic device according to another embodiment.

FIG. 9 is a perspective view of a portable electronic device according to another embodiment.

Referring to FIG. 9, a portable electronic device 2 according to another embodiment may be a portable electronic device such as a mobile communications terminal, a smartphone, a tablet personal computer (PC), in which camera modules 500 and 1000 are mounted.

One or more of the camera modules 500 and 1000 may be the camera module 1000 according to the embodiments described with reference to FIGS. 2 through 8C.

That is, a portable electronic device including a dual camera module includes the camera module 1000 according to an embodiment as one or both of two camera modules.

As set forth above, the reflecting module for OIS and the camera module including the same according to the exemplary embodiment in the present disclosure has a simple structure and a reduced size while implementing the auto-focusing function, the zoom function, and the OIS function. In addition, power consumption is significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflecting module for optical image stabilization (OIS), comprising:
a housing comprising an internal space;
a moving holder supported in the internal space of the housing by an elastic member;
a reflecting member disposed on the moving holder; and
a driving part configured to provide driving force to the moving holder such that the moving holder moves relative to the housing,
wherein the driving part comprises,
two magnets having a shorter length in a first axial direction than in a second axial direction perpendicular to the first axial direction and disposed on the moving holder to be spaced apart from each other in the first axial direction, and
four or more coils disposed on the housing, the four or more coils being disposed as two sets, comprising a first set of two or more coils aligned in the second axial direction and spaced apart from each other in the first axial direction, facing the two magnets.

2. The reflecting module for OIS of claim 1, wherein the two sets of coils comprise a second set of two or more coils aligned in the second axial direction and spaced apart from each other in the first axial direction facing the two magnets.

3. The reflecting module for OIS of claim 1, wherein both of the two magnets are configured to rotate the moving holder around a first axis and a second axis.

4. The reflecting module for OIS of claim 1, wherein one side of the two magnets in the second axial direction are North poles, and the other side of the two magnets in the second axial direction are South poles.

5. The reflecting module for OIS of claim 4, wherein the four or more coils are disposed in positions corresponding to the North poles and the South poles of the two magnets.

6. The reflecting module for OIS of claim 1, wherein the elastic member comprises a first spring extended in the first axial direction and a second spring extended in the second axial direction, perpendicular to the first axial direction, wherein the first spring and the second spring are integral with each other.

7. The reflecting module for OIS of claim 6, wherein the first spring comprises one or more springs extended in the first axial direction, and the second spring comprises one or more springs extended in the second axial direction.

8. The reflecting module for OIS of claim 6, wherein the elastic member comprises a connection portion between the first spring and the second spring having a bent or angular shape.

9. The reflecting module for OIS of claim 1, wherein the elastic member is substantially entirely coplanar.

10. The reflecting module for OIS of claim 1, wherein the elastic member is disposed on a lower surface of the moving holder, and the reflecting member is disposed on an upper surface of the moving holder.

11. The reflecting module for OIS of claim 1, wherein the elastic member comprises two portions.

12. The reflecting module for OIS of claim 1, wherein the elastic member is entirely one piece.

13. The reflecting module for OIS of claim 1, wherein the two magnets are disposed in seating grooves disposed in a lower surface of the moving holder.

14. A camera module comprising:
a lens module comprising lenses; and
the reflecting module for OIS of claim 1 disposed in front of the lens module and configured to change a path of light incident onto the reflecting module such that the light is directed toward the lens module.

15. A portable electronic device comprising the camera module of claim 14.

16. The portable electronic device of claim 15, wherein an optical axis of the lens module is perpendicular to a thickness direction of the portable electronic device.

* * * * *